Nov. 1, 1932.    G. ANDERSON    1,885,170
PORTABLE HOISTING APPARATUS
Filed Feb. 11, 1931    2 Sheets-Sheet 1

Inventor
Glenn Anderson
By Clarence A. O'Brien
Attorney

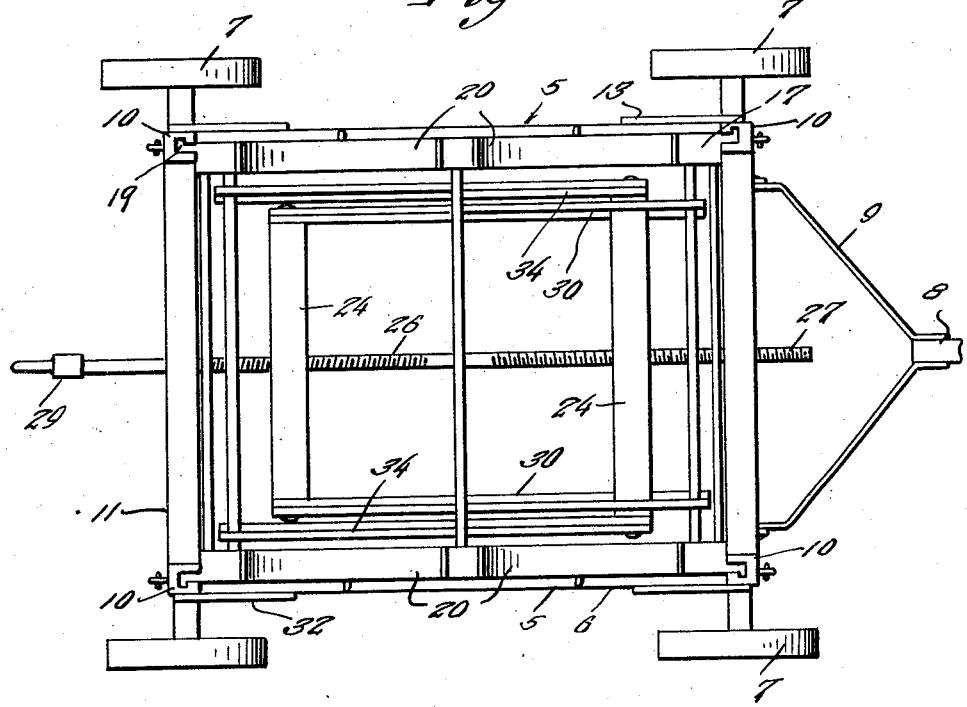
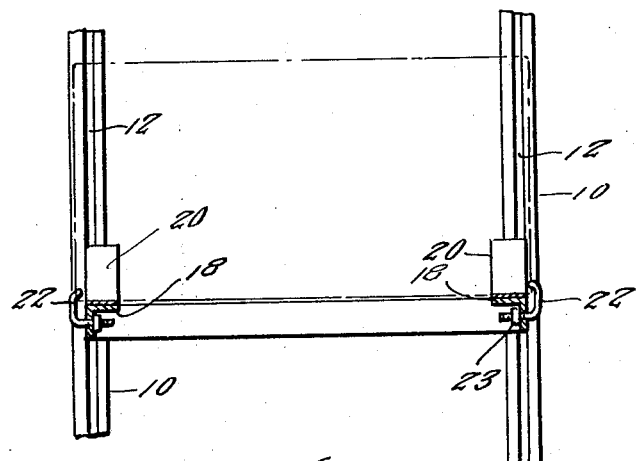

Patented Nov. 1, 1932

1,885,170

UNITED STATES PATENT OFFICE

GLENN ANDERSON, OF ONAWA, IOWA

PORTABLE HOISTING APPARATUS

Application filed February 11, 1931. Serial No. 515,077.

This invention relates to an apparatus or device which is especially, but not necessarily, designed for farm usage, and constructed to provide a convenient and reliable conveyance for transporting and handling heavy containers such as oil and gasoline and fuel drums.

Briefly stated, the invention has to do with a wheel supported frame constituting a carriage for a super structure on which a platform is mounted for vertical adjustment, said platform being provided with supporting blocks especially designed to accommodate two or more horizontally disposed liquid containing drums or barrels and said platform having means whereby the elevation thereof can be varied and held to maintain the drums at an appropriate elevation for convenient dispensing purposes.

It frequently happens that the route of a tractor or farm machine may be over a comparatively great area while performing the day's work and it is obviously convenient to provide a trailer to be attached thereto whereby said trailer is constructed to support barrels or drums for containing reserve oil and gasoline for lubricating and fuel purposes.

It is therefore an object of the invention to provide a simple and economical wheel-supported conveyance which will accomplish this result in a satisfactory and dependable manner.

The particular details and mechanical coordination thereof in the development of this improved addition to the art and trade will become more readily apparent from the following description and drawings.

In the drawings:

Figure 2 is a top plan view thereof.

Figure 4 is a horizontal sectional view.

Figure 1:
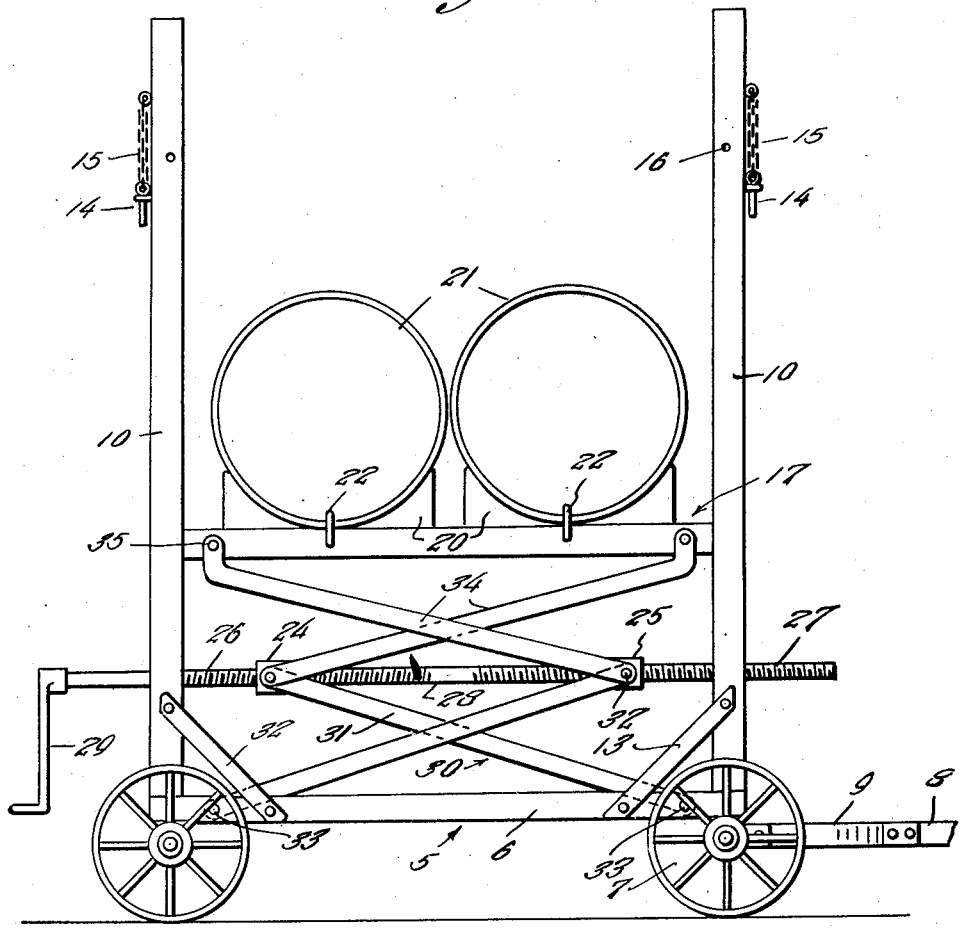
Figure 1 is a side elevational view of an apparatus constructed in accordance with the present invention.
Figure 3:
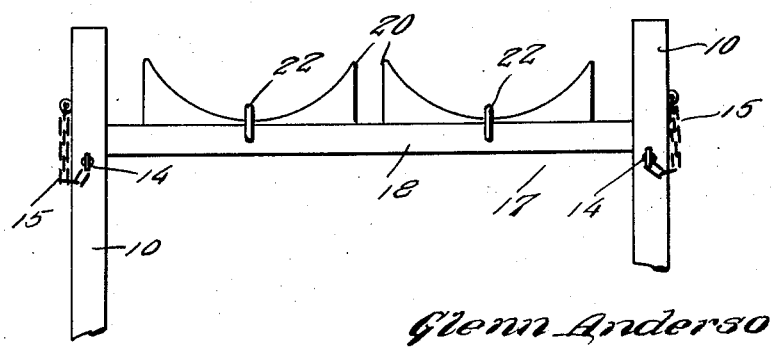
Figure 3 is a side elevation of the upper portion of the structure.

In the drawings, in Figure 1, the numeral 5 designates a wheel supported carriage which includes a horizontal frame 6 of appropriate construction supported on transporting wheels 7. The numeral 8 designates a draft tongue fastened to the carriage by an appropriate swingable horizontally disposed yoke 9.

Rising from the four corners of the frame 6 are standards or posts 10 joined together by suitable connecting members 11. Each post is formed with a substantially L-shaped groove or guideway 12. The numeral 13 designates diagonal corner braces between the frame 6 and the posts 10. The numerals 14 represent retaining pins carried by suspension chains 15, said pins being adapted to be inserted into keeper holes 16 to suspend the hoisting platform 17 in an elevated position.

This platform is in the form of an openwork frame and includes spaced parallel angle irons 18, each having a substantially L-shaped guide lug 19 at opposite ends and said guide lugs are fitted in the correspondingly shaped guide grooves 12 of the post. This arrangement permits free sliding of the frame or platform 17 and avoids displacement thereof.

The numerals 20 designate what may be conveniently termed saddles which are shaped to accommodate the valve or drum 21. Obviously these drums are adapted to contain liquid such as oil, gasolene or the like. If desired, retaining hooks 22 may be provided on these angle irons 18, each hook including a screw-threaded shank carrying an adjusting and retaining nut 23, the hooks being adapted to engage over the rim portion of the head of the drum as represented for example in Figure 1. These hook bolts provide clamps for holding the drum in the saddle.

An expansible and contractible raising and lowering mechanism is arranged between the frames 6 and 17 to permit the raising or lowering of the frame or platform 17.

This mechanism comprises a pair of spaced parallel horizontally disposed bars 24 and 25 which co-operate with the right and left hand screw-threads 26 and 27 respectively of a feed screw 28. More specifically, the feed screw is threaded through the intermediate portions of the cross bars 24 and 25.

A pair of lazy tong devices are also provided and each device is represented by the numeral 30. This device comprises a pair of lower links 31 pivotally connected as at 32 to the opposite ends of the adjustable bar members 24 and 25. The lower ends of these links however are pivotally anchored as at 33 on the frame 6.

Co-operating with the links 31 are additional companion links 34 disposed in intersecting relationship and pivotally connected at their lower ends with the bars 24 and 25 and pivotally connected at their upper ends as at 35 with the elevating or hoisting platform 17. Assuming then that the barrels or drums 21 are seated in the saddles 20 and are fastened therein by the hookbolts 22, it is obvious that the structure is in readiness to transport the drums to the desired place and to permit the drums to be raised or lowered to a desired elevation for dispensing purposes.

Through the medium of the feed screw 28 and its crank 29 and the co-operating actuating bars 24 and 25, and right and left hand threads, it is possible to expand or contract the lazy tong devices 30 on opposite sides of the apparatus to raise or lower the platform 17. Consequently the carriage can be hauled from place to place by separate draft means or can be hooked to a tractor and carried along with the tractor. Then when it is desired to raise the drum this can be expeditiously accomplished by the mechanism just described. The result is a saving in time and labor and convenience in the handling of heavy fluid drums of this character.

The gist of the invention is in the provision of a properly balanced carriage having a suitable center of gravity and a superstructure mounted thereon and including posts to accomodate the platform 17 and raising and lowering means therefor.

While the preferred embodiment of the invention has been shown and described, it is to be understood that minor changes in shape, size, materials and rearrangement of parts coming within the field of invention claimed may be resorted to in actual practice, if desired.

I claim:

The herein described portable apparatus for the purpose described, consisting essentially of a frame having upstanding corner posts and guideways in said posts, the upper portions of the posts being apertured, ground wheels connected with and supporting said frame, a vertically movable platform disposed between said posts and interlocked therewith, pins flexibly connected with the upper portions of the posts and adapted to be arranged in the apertures thereof to positively support the platform in an elevated position, lazy-tongs arranged at opposite sides of the wheel-supported frame and including transverse bars with appropriately threaded central horizontally disposed and aligned apertures therein and also including lower side links crossed and connected at their lower ends to opposite end portions of the frame and at their upper ends to said transverse bar, and upper crossed links arranged at opposite sides of the apparatus and connected at their lower ends to said transverse bars and at their upper ends to opposite end portions of said vertically movable platform, and a longitudinal central screw mounted in the frame and having oppositely threaded portions engaging in the threaded apertures of the transverse bars and also having at one end a handle.

In testimony whereof I affix my signature.

GLENN ANDERSON.